Jan. 31, 1961  B. THOMPSON  2,970,023
PISTON RING
Filed Feb. 24, 1958
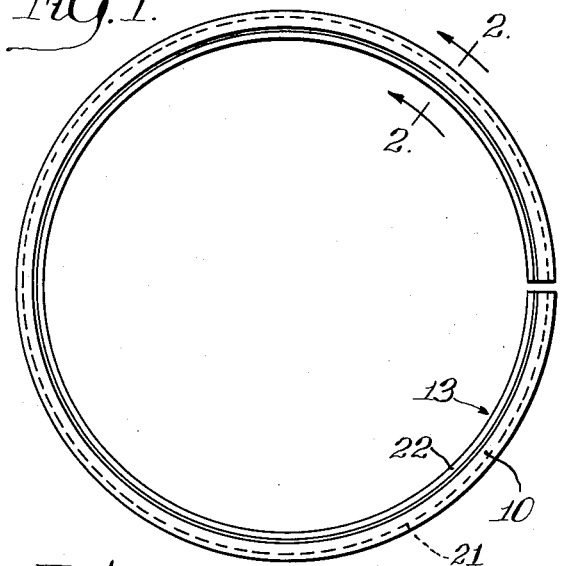
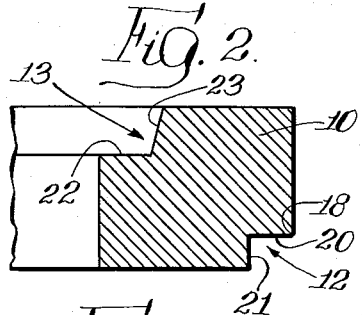
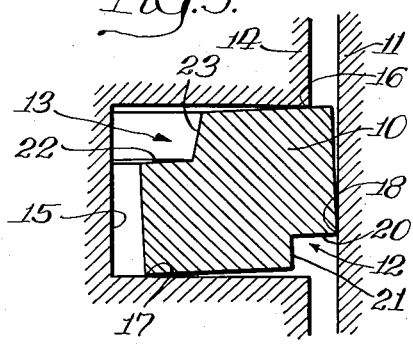
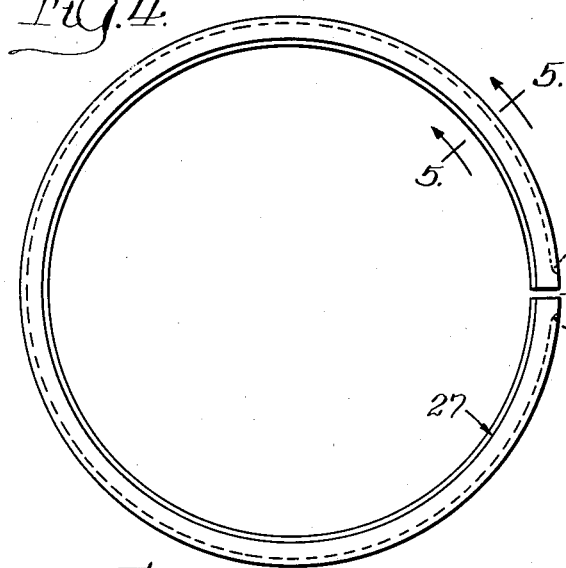
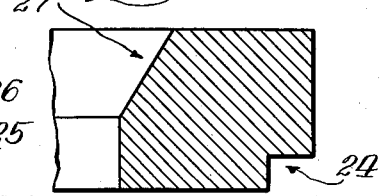
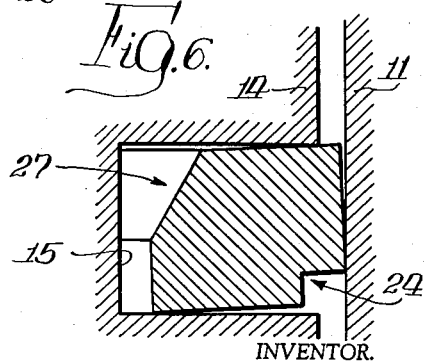
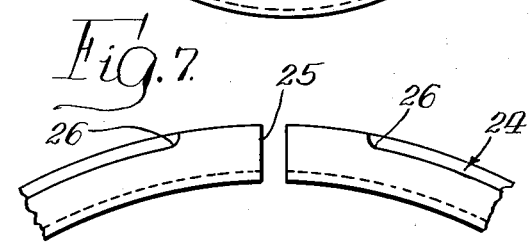
INVENTOR.
Bert Thompson
BY
Atty's.

2,970,023
PISTON RING

Bert Thompson, Hagerstown, Ind., assignor to Perfect Circle Corporation, Hagerstown, Ind., a corporation of Indiana Filed Feb. 24, 1958, Ser. No. 717,115

1 Claim. (Cl. 309—44)

The invention relates to piston rings for internal combustion engines and more particularly to a compression ring.

The general object of the invention is to provide a novel compression ring which also functions to assist in controlling oil.

Another object is to provide a novel compression ring which has an effective sealing action with the sides of the groove in the piston during critical portions of the engine cycle.

A further object is to provide a novel compression ring of the foregoing character, which is easily manufactured.

Other objects and advantages will become apparent from the following description and the accompanying drawing in which:

Fig. 1 is a top plan view of a ring embodying the features of the invention;

Fig. 2 is an enlarged fragmentary cross sectional view of the ring before being compressed for insertion in the cylinder;

Fig. 3 is a view similar to Fig. 2 but showing the ring in its relation to the piston and cylinder;

Fig. 4 is a view similar to Fig. 1 but showing a modified form of ring;

Fig. 5 is a view similar to Fig. 2 but showing the ring of Fig. 4;

Fig. 6 is a view similar to Fig. 3 but showing the ring of Fig. 4; and

Fig. 7 is a bottom plan view of a portion of the ring of Fig. 4.

The form of piston usually used in automotive internal combustion engines ordinarily has a pair of compression rings and an oil ring, the latter being normally considered to be sufficient to control the oil on the cylinder wall. However, in some engines of this type where oil control problems are difficult, and in many present day engines where a high vacuum occurs on the suction stroke of the piston, it is desirable to use a compression ring or rings which assist in the control of oil. Thus, it may be desirable to construct one or both of the compression rings in such a manner that a scraping action on the cylinder wall is obtained to remove any excess oil getting past the oil ring and that a seal with the sides of the groove in the piston is effected so that oil cannot be drawn above the ring from the space in the groove behind the ring.

A ring embodying the invention has these features and they are attained by so constructing the ring that it tends to twist, from a flat condition when free, by compressing the ring to the extent necessary to fit within the cylinder, thereby dishing the ring. By such twisting, the face of the ring which may be initially substantially cylindrical, is caused to assume a position at an angle to the cylinder wall, providing a scraping edge at the lower side of the ring. The twisting also causes the ring to take up the normal clearance between the ring and the sides of the groove so that the ring engages the sides of the groove to provide a seal at the lines of contact. The direction of twist, which provides the scraping edge at the lower side of the ring, thus effects a seal with the upper side of the groove at the periphery of the piston adjacent the face of the ring and a seal with the lower side of the groove at the inner periphery of the ring.

The twist in the desired direction is obtained by forming a groove or rabbet in the ring at the lower side of the face of the ring and another groove or rabbet in the ring at the upper side of the inner periphery. While each type of groove has been used separately in rings heretofore, an increased twist in the ring by increasing the size of a single groove of either type could not be obtained without materially weakening the ring. The two grooves of the character described, in a single ring, produce an unexpectedly large amount of twist without materially weakening the ring. It has been found that the amount of twist obtained in the present ring is from more than two times to three times the amount of twist obtained when a ring has only one groove of either type. Such large amount of twist in the present ring is greater than the normal clearance between the ring when flat and the sides of the groove, and consequently the ring resiliently engages the sides of the groove to provide a seal at each side, at least throughout the major portion of the circumference.

One embodiment of the ring, shown in Figs. 1, 2 and 3, comprises a ring body 10 which may be initially formed in a generally rectangular shape in radial cross section. The two sides of the ring are shown as being parallel, and the face of the ring is shown as being perpendicular to the sides. The face, of course, may be slightly tapered to make a sharper scraping edge when the ring twists. When the ring is free and unstressed, the sides of the ring lie in radial planes, as illustrated in Fig. 2.

To give the ring the desired twist when compressed within the cylinder, indicated at 11 in Fig. 3, a pair of grooves are formed in the rectangularly shaped body 10. Thus, one groove, indicated at 12, extends inwardly from the face of the ring at the lower side thereof, while the other groove, indicated at 13, is diagonally related to the groove 12 and extends outwardly from the inner periphery of the ring at the upper side thereof. The two grooves may of course be formed by a cutting operation. The two grooves 12 and 13 cause the ring to twist in the manner illustrated in Fig. 3 when the ring is compressed for confinement without the cylinder 11. An unexpectedly large amount or degree of twist is obtained by the grooves 12 and 13, such amount being more than two times to three times the amount if either the groove 12 or the groove 13 were used alone. In fact, the amount of twist is greater than the clearance normally provided between a ring and the sides of the groove in the piston. Thus, in Fig. 3 where the piston is partially shown at 14 and the ring receiving groove at 15, the ring resiliently contacts the upper side of the groove 15 at the periphery of the piston 14 adjacent the face of the ring, as indicated at 16, and the lower side of the groove 15 at the inner periphery of the ring, as indicated at 17.

The groove 12 is of such shape that it intersects the face of the ring at an angle in the neighborhood of 90°. Thus, when the ring twists, the intersection of the groove 12 and the face of the ring forms a scraping edge 18 engaging the cylinder wall 11 to scrape oil downwardly on the downward stroke of the piston. In the present instance, the groove 12 is rectangular and provides a side surface 20 perpendicular to the face of the ring and an inner or bottom surface 21 perpendicular to the lower side of the ring. The groove 12 extends around the entire face of the ring. The axial dimension of the groove may of course vary in rings of different thickness.

The groove 13 is in the form of a counterbore in the upper side of the ring and is shown as providing a lower surface generally perpendicular to the inner periphery of the ring, as indicated at 22, and an outer surface extending upwardly to the upper side of the ring and in this instance tapering upwardly and outwardly, as indicated at 23.

In the embodiment of the invention shown in Figs. 4 to 7, the grooves in the ring are of somewhat different shape from those shown at 12 and 13 in Figs. 1, 2 and 3. Thus, the groove at the lower side of the face of the ring, indicated at 24 in this embodiment, is shown as being the same as the groove 12 in radial cross section. However, adjacent the gap in the ring, shown at 25, the groove 24 terminates at both of its ends at a point spaced from the gap 25, as indicated at 26 in Fig. 7.

The groove at the upper side of the inner periphery of the ring, in this embodiment, is shown as being formed by a bevel 27 extending upwardly and outwardly from the inner periphery of the ring.

While the faces of the ring in both embodiments are shown without any special surface treatment, the faces may be chrome plated, if desired, to reduced the rate of wear, or other surface treatment may be given.

I claim:

A piston ring having substantially parallel sides with an annular rabbet at the lower side of the face of the ring and another annular rabbet at the upper side of the inner periphery of the ring, the first-mentioned rabbet intersecting the face of the ring at an angle in the neighborhood of 90° to form a cylinder-contacting scraping edge at the lower side when the ring is twisted and said second-mentioned rabbet being a counterbore having a lower surface generally perpendicular to the inner periphery of the ring and an outer surface extending upwardly and outwardly to the upper side of the ring, said rabbets, when the ring is compressed for insertion in the cylinder, cooperating with each other and thereby tending to produce a twist dishing the ring downwardly at its inner periphery and upwardly at its face, the upper side of the face of the ring and the lower side of the inner periphery being so shaped as to have no material opposing affect on the twist produced by said rabbet.

References Cited in the file of this patent

UNITED STATES PATENTS

| | | |
|---|---|---|
| 2,173,190 | Wilkening | Sept. 19, 1939 |
| 2,387,855 | Phillip | Oct. 30, 1945 |
| 2,459,395 | Smith | Jan. 18, 1949 |
| 2,798,779 | Swartz et al. | July 9, 1957 |

FOREIGN PATENTS

| | | |
|---|---|---|
| 630,656 | Great Britain | Oct. 18, 1949 |

OTHER REFERENCES

"Piston Rings," Automotive Engineer; January 1946, pp. 29–35.

"Late Trends in Piston Ring . . .," Diesel Power and Diesel Transportation; June 1947, pp. 37–41.

UNITED STATES PATENT OFFICE
CERTIFICATION OF CORRECTION

Patent No. 2,970,023                          January 31, 1961

Bert Thompson

It is hereby certified that error appears in the above numbered patent requiring correction and that the said Letters Patent should read as corrected below.

Column 2, line 47, for "without" read -- within --.

Signed and sealed this 4th day of July 1961.

(SEAL)
Attest:

ERNEST W. SWIDER
Attesting Officer

DAVID L. LADD
Commissioner of Patents